US008855194B2

United States Patent
Kumar et al.

(10) Patent No.: US 8,855,194 B2
(45) Date of Patent: Oct. 7, 2014

(54) UPDATING NON-SHADOW REGISTERS IN VIDEO ENCODER

(75) Inventors: Purushotam Kumar, Bangalore (IN); Sivaraj Rajamonickam, Bangalore (IN); Brijesh Rameshbhai Jadav, Bangalore (IN); Manjunath Rudranna Hadli, Belguam (IN)

(73) Assignee: Texas Instruments Incorporated, Dallas, TX (US)

( * ) Notice: Subject to any disclaimer, the term of this patent is extended or adjusted under 35 U.S.C. 154(b) by 409 days.

(21) Appl. No.: 13/103,745

(22) Filed: May 9, 2011

(65) Prior Publication Data

US 2012/0287337 A1 Nov. 15, 2012

(51) Int. Cl.
| | | |
|---|---|---|
| H04N 7/12 | (2006.01) | |
| G06T 7/20 | (2006.01) | |
| H04N 5/14 | (2006.01) | |
| H04N 19/51 | (2014.01) | |

(52) U.S. Cl.
CPC .................. *H04N 5/14* (2013.01); *H04N 5/145* (2013.01); *H04N 5/144* (2013.01); *G06T 7/20* (2013.01); *H04N 7/368* (2013.01); *H04N 5/141* (2013.01)
USPC ............. 375/240.01; 375/240.02; 375/240.03

(58) Field of Classification Search
CPC ........... H04N 5/14; H04N 5/85; H04N 5/141; H04N 5/142; H04N 5/144; H04N 5/145; H04N 5/147; H04N 5/148; H04N 7/50; H04N 7/26271; H04N 7/26244; H04N 7/368; H04N 9/8042; G06T 7/20
USPC .................................................. 375/240.01
See application file for complete search history.

(56) References Cited

U.S. PATENT DOCUMENTS

| | | | | |
|---|---|---|---|---|
| 4,800,431 A * | 1/1989 | Deering | ........................ | 348/719 |
| 6,012,137 A * | 1/2000 | Bublil et al. | .................... | 712/36 |
| 6,128,728 A * | 10/2000 | Dowling | ...................... | 712/228 |
| 6,247,079 B1 * | 6/2001 | Papa et al. | .................... | 710/302 |
| 6,370,640 B1 * | 4/2002 | Dowling | ...................... | 712/228 |
| 6,487,654 B2 * | 11/2002 | Dowling | ...................... | 712/244 |
| 6,621,434 B2 * | 9/2003 | Barry et al. | .................. | 341/141 |
| 6,708,246 B1 * | 3/2004 | Ishihara et al. | ............... | 710/309 |
| 7,113,546 B1 * | 9/2006 | Kovacevic et al. | ....... | 375/240.26 |
| 8,190,807 B2 * | 5/2012 | Reid et al. | ........................ | 711/3 |
| 8,250,250 B2 * | 8/2012 | Moallem et al. | ................ | 710/20 |
| 8,327,187 B1 * | 12/2012 | Metcalf | ........................... | 714/10 |
| 8,386,688 B2 * | 2/2013 | Fullerton et al. | ............. | 710/308 |
| 2001/0027514 A1 * | 10/2001 | Goto | ............................... | 712/42 |

(Continued)

OTHER PUBLICATIONS

Bilong et al, Mehtod of Using Shaddow Registers in designing an on-chip Debu Unit of a Microprocessor, 2003.*

(Continued)

*Primary Examiner* — Andy Rao
*Assistant Examiner* — Shan Elahi
(74) *Attorney, Agent, or Firm* — Robert D. Marshall, Jr.; Frederick J. Telecky, Jr.

(57) ABSTRACT

A video processor controlled by a set of non-shadow registers is provided. A list of updates for one or more of the non-shadow registers may be prepared in a memory module. A frame buffer is updated with video data for a display coupled to the video processor. A blanking interval is detected after updating the frame buffer. A direct memory access engine is triggered to transfer the list of updates from the memory module to the non-shadow registers during the blanking interval.

10 Claims, 5 Drawing Sheets

(56) References Cited

U.S. PATENT DOCUMENTS

| | | | |
|---|---|---|---|
| 2002/0052993 A1* | 5/2002 | Dowling | 710/260 |
| 2002/0054588 A1* | 5/2002 | Mehta et al. | 370/352 |
| 2003/0093607 A1* | 5/2003 | Main et al. | 710/306 |
| 2004/0250042 A1* | 12/2004 | Mehta et al. | 711/206 |
| 2005/0005088 A1* | 1/2005 | Yearsley et al. | 712/235 |
| 2005/0094164 A1* | 5/2005 | Keithley et al. | 358/1.7 |
| 2005/0185221 A1* | 8/2005 | Keithley | 358/2.1 |
| 2006/0004946 A1* | 1/2006 | Shah et al. | 711/100 |
| 2006/0020831 A1* | 1/2006 | Golla et al. | 713/300 |
| 2007/0283122 A1* | 12/2007 | Mehta et al. | 711/206 |
| 2008/0114937 A1* | 5/2008 | Reid et al. | 711/117 |
| 2008/0140999 A1* | 6/2008 | Gong | 712/214 |
| 2008/0168259 A1* | 7/2008 | Biran et al. | 712/207 |
| 2010/0161848 A1* | 6/2010 | Flachs et al. | 710/23 |
| 2010/0161923 A1* | 6/2010 | GadelRab | 711/162 |
| 2010/0198936 A1* | 8/2010 | Burchard et al. | 709/212 |
| 2010/0262728 A1* | 10/2010 | Hwang et al. | 710/25 |
| 2011/0242425 A1* | 10/2011 | Zeng | 348/705 |
| 2012/0036284 A1* | 2/2012 | Tao et al. | 710/16 |

OTHER PUBLICATIONS

Cong et al, Instruction Set Extension with Shadow Registers for Configurable Processors, 2005.*

"TMS320C6474 DSP Enhanced DMA (EDMA3) Controller User's Guide", Literature No. SPRUG11A, Texas Instruments Incorporated, pp. 1-178, Oct. 2008, Revised Jan. 2010.

* cited by examiner

UPDATING NON-SHADOW REGISTERS IN VIDEO ENCODER

FIELD OF THE INVENTION

This invention generally relates to video processing in hardware engines, and more particularly to updating non-shadowed registers that control aspects of the video processing operation.

BACKGROUND OF THE INVENTION

Typically, a video processing solution is composed of hardware accelerators (HWAs), connected to a central programmable unit (CPU) that is in charge of initializing and starting the different hardware accelerators along with managing all their input/output data transfers. As the image resolutions to be processed become higher and video standards become more complex, the number of hardware accelerators needed to support such features may increase. Thus the task scheduling on the different HWAs may become a bottleneck that requires increased processing capabilities in the CPU. Increasing performance of the CPU may be detrimental to size and power usage.

In a typical implementation, all nodes are activated and controlled by the central CPU. Data can be exchanged between nodes and the CPU either by a common memory or by DMA (direct memory access). The CPU typically responds to interrupt requests from the various HWAs to schedule tasks.

The vertical blanking interval (VBI), also known as the vertical interval or VBLANK, is the time difference between the last line of one frame or field of a raster display, and the beginning of the first line of the next frame. It is present in analog television, VGA (video graphics array), DVI (digital visual interface) and other signals. During the VBI the incoming data stream is not displayed on the screen. In raster cathode ray tube displays the beam is blanked to avoid displaying the retrace line; see raster scan for details.

The VBI was originally needed because of the inductive inertia of the magnetic coils which deflect the electron beam vertically in a CRT; the magnetic field, and hence the position being drawn, cannot change instantly. For horizontal deflection, there is also a pause between successive lines, to allow the beam to return from right to left, called the horizontal retrace or horizontal blanking interval. While modern digital equipment does not require a long blanking time, it must be designed to retain compatibility with the broadcast standards intended for older equipment.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A video processor may have a large number of registers that are used to control and configure various aspects of the operation of the video processor. Due to the nature of video processing, multiple registers may need to be changed/updated within a short period of time, for example, during the horizontal or vertical refresh period. One way to do this is to provide shadow registers. A shadow register is coupled to an active register and may be loaded ahead of time and then the contents of the shadow register may be transferred to the active register in response to a command signal. In this manner, a large number of shadow registers may be loaded over a period of time, and then all of them can be transferred in a parallel manner to their respective active registers in response to the common control signal.

Unfortunately, implementing shadow registers for a large number of active registers and providing control signals for various groups of shadow registers may require a significant amount of real estate on an integrated circuit. Embodiments of the present invention provide for programming of non-shadow registers precisely during the vertical blanking interval without the expense of adding shadow registers.

Non-shadow registers of the hardware are registers whose updates take effect immediately as soon as the registers are written. In this embodiment, non-shadow register features may control changing of various runtime configuration data, such as video PIP (Picture in Picture) positioning, scaling coefficients, brightness, contrast, video path changes, etc. Because of the behavior of non-shadow registers, these registers should be updated only when the display is stopped or during the vertical/horizontal blanking interval when there is no active video to display. Otherwise, there could be distortion in a few lines or flicker if the update of these registers is not achieved within the blanking period.

The duration of vertical/horizontal blanking intervals is generally less than the time required by software to program the registers in a vsync interrupt routine. For a NTSC system, the vertical blanking interval is around 1.5 ms and the horizontal blanking interval is around 5-6 micro seconds. Thus, programming of non-shadow register during horizontal blanking period is difficult using an interrupt service routine. Even the vertical blanking interval is not always sufficient given the system load on a CPU that controls the video system.

Embodiments of the invention allow guaranteed update of non-shadow registers during the vertical blanking period without impacting the currently displayed video frame. This allows a video application to change the non-shadow video parameters while the display is in progress. Furthermore, the non-shadow registers may be changed on a frame by frame basis.

Some embodiments of the invention may also provide for starting and stopping of different displays coupled to a hardware engine without interrupting an on-going display on other video paths.

Figure 1:
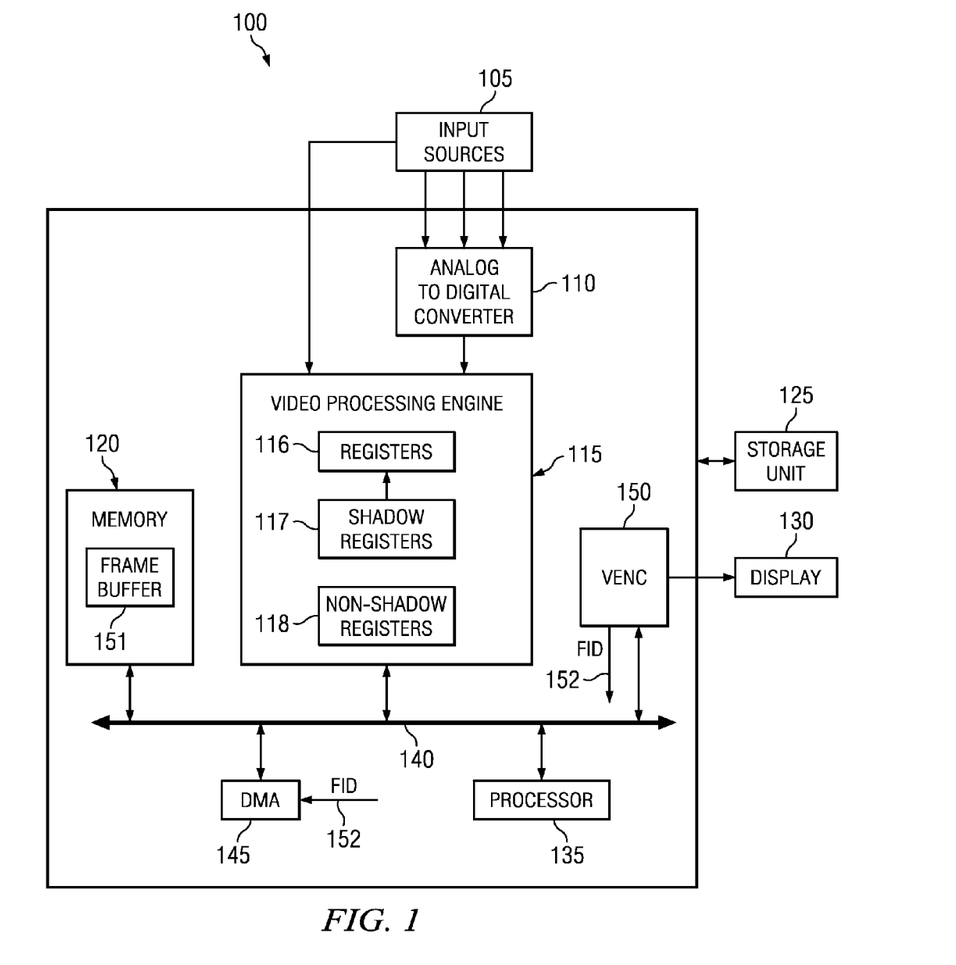
FIG. 1 is a block diagram of a video processing system that embodies an aspect of the present invention.

FIG. 1 illustrates an example electronic device 100 to that embodies the invention. Electronic device 100 may embody a digital video recorder/player, a mobile phone, a television, a laptop or other computer or a personal digital assistant (PDA), for example. A plurality of input sources 105 may feed video to an analog-to-digital converter (ADC) 110. Examples of input sources 105 include a camera, a camcorder, a portable disk, a storage device, a USB or any other external storage media. ADC 110 converts analog video feeds into digital data and supplies the digital data to video processing engine (VPE) 115. As illustrated in FIG. 1, digital video feeds from digital sources such as a digital camera may be provided directly to VPE 115 from input sources 105. The VPE 115 receives the digital data corresponding to each video frame of the video feed and stores the data in a memory 120. Multiple frames are stored corresponding to a video channel in a block of memory locations.

VPE 115 includes a number of registers that control the operation of VPE 115. For example, there are various active registers 116 that are paired with shadow registers 117. Shadow registers 117 may be loaded at any time and then be transferred in parallel to active registers 116 in response to a control signal. Non-shadow registers 118 are active registers that are not paired with a respective shadow register. As soon as each non-shadow register 118 is loaded by writing new control data to it, it immediately reflects the new control data on its output.

An application being executed on processor 135 retains pointers to the block of memory locations corresponding to each channel of video from each input device. The application can request the VPE perform different functions for different channels. As an example, a video stream coming from a camera may be down scaled from 1920 by 1080 pixels to 720 by 480 pixels and a second video stream coming from a hard disk or a network may be upscaled from 352 by 288 pixels to 720 by 480 pixels. The application can also perform one or more functions such as indicating size of the input video, indicating size of the output video or indicating a re-sizing operation to be performed by the VPE 115. Re-sizing can include upscaling, downscaling and cropping of frames dependent on various factors such as image resolution, etc. For example, two input videos having 720 by 480 pixel frames can be re-sized into output videos of 352 by 240 pixel frames by the VPE 115. The input videos can then be combined and provided to a display 130 through a communication channel. The re-sized output videos can also be stored in memory 120. In some embodiments, a processor 135 in communication with the VPE 115 includes the application that performs the one or more functions. Examples of a processor 135 include a central processing unit (CPU), a reduced instruction set processor (RISC), and a digital signal processor (DSP) capable of program controlled data processing operations. In some embodiments, some of the video processing may also be performed by processor 135 in connection with VPE 115.

A video decoder component within VPE 115 decodes frames in an encoded video sequence received from a digital video camera in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), ITU-T/ISO High Efficiency Video Coding (HEVC) standard, etc. The decoded frames may be provided to a video encoder 150 for display on a display device 130.

Video encoder (VENC) 150 creates a complete video frame including active video data and blanking data and it does some video processing, such as converting from digital data to analog, converting from RGB to YUV etc. The output of VENC is typically connected to a TV or a display device, such as display device 130.

A TV typically displays a frame in two phases. First it display all even lines, which is known as Even field and then it displays all odd lines of the field, which is known as the odd field. To identify these even and odd fields, there is special signal which is known as a "field Id". VENC 150 generates a Field ID signal 152 depending on whether it is sending out an Even or an Odd field. This is the case for interlaced video. Even in the case of progressive video, FID toggles in order to identify the start of new frames.

Direct Memory Access (DMA) engine 145 is a multi-channel DMA engine that may be used to transfer data between locations in memory 120 and memory mapped locations in Video processing engine 115, VENC 150 and processor 135, for example. Additional memories and other peripheral devices, not shown, may also be accessed by DMA 145. In particular, registers 116, shadow registers 117 and non-shadow registers 118 in VPE 115 may be accessed and loaded by DMA 145.

Figure 2:
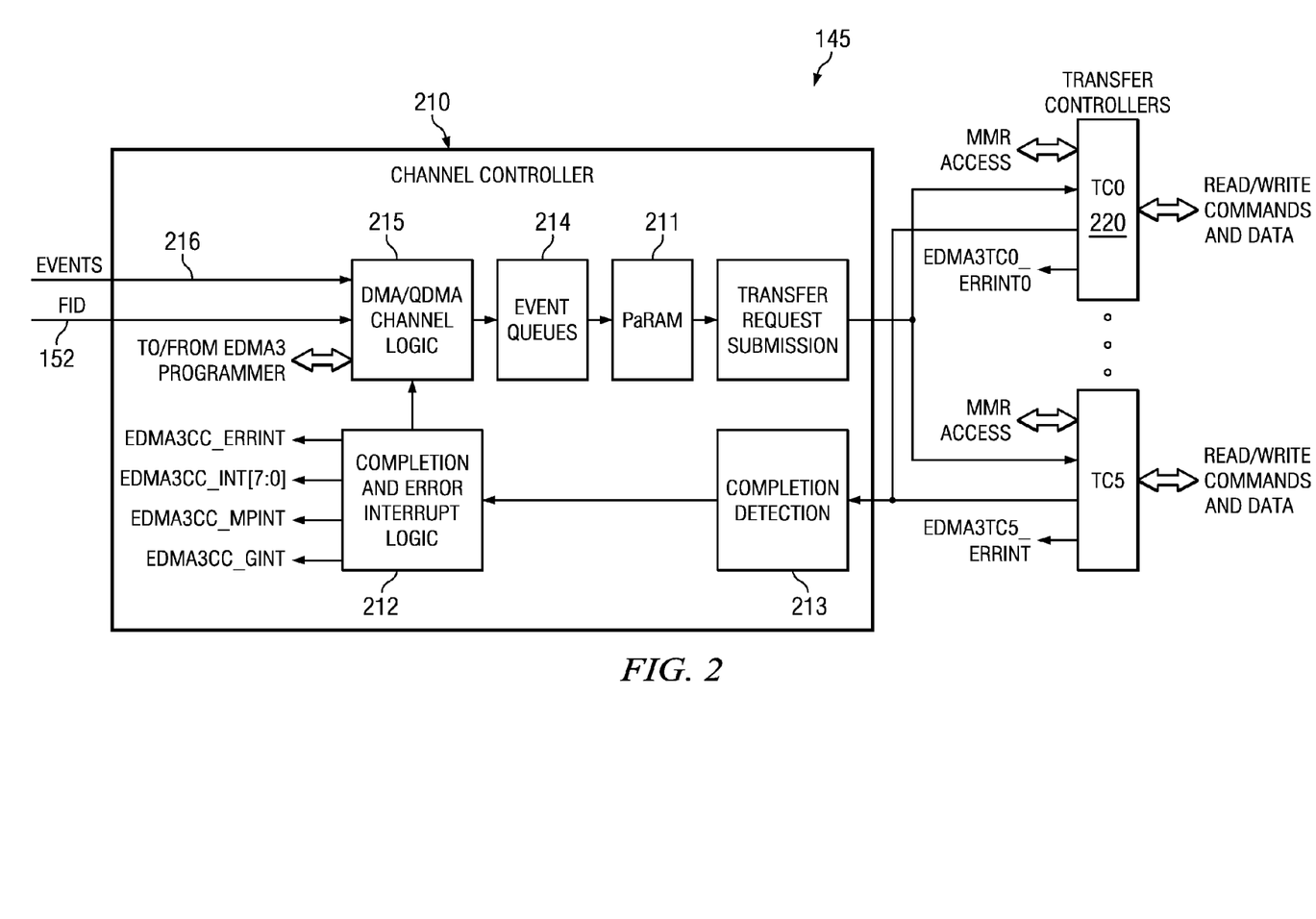
FIG. 2 is a block diagram of a DMA engine used within the processing system of FIG. 1.

FIG. 2 is a block diagram of DMA engine 145 used within the processing system of FIG. 1. DMA 145 includes a channel controller 210 and a set of transfer controllers 220. In this embodiment there are six transfer controllers (TC), but other embodiments may have a different DMA configuration.

The main blocks of DMA 145 channel controller 210 may be as follows:

Parameter RAM (PaRAM) 211: a PaRAM maintains parameter sets for channel and reload parameter sets. The PaRAM is written with a transfer context for a respective channel and link parameter sets. DMA 145 processes sets based on a trigger event and submits a transfer request (TR) to a transfer controller 220 associated with the channel.

DMA event and interrupt processing registers: allows mapping of events to parameter sets, enable/disable events, enable/disable interrupt conditions, and clearing interrupts.

Completion detection 213: the completion detect block detects completion of transfers by the DMA and/or slave peripherals. Completion of transfers may optionally be used to chain trigger new transfers or to assert interrupts.

Event queues 214: event queues form the interface between the event detection logic and the transfer request submission logic.

Channel logic 215: channel logic controls the operation of the multiple DMA channels and queues.

Other functions include the following:

Region registers: region registers allow DMA resources (DMA channels and interrupts) to be assigned to unique regions that different DMA programs or different application threads may own.

Debug registers: Debug registers allow debug visibility by providing registers to read the queue status, controller status, and missed event status. DMA 145 includes two channel types: DMA channels (64 channels) and QDMA channels (8 channels).

Memory protection registers: memory protection registers define the accesses (privilege level and requestor(s)) that are allowed to access the DMA channel shadow region view(s) and regions of PaRAM.

Each channel is associated with a given event queue/transfer controller and with a given PaRAM set. The main thing that differentiates a DMA channel from a QDMA channel is the method that the system uses to trigger transfers.

A trigger event is necessary to initiate a transfer. A trigger event may be due to an external event 216, manual write to the event set register, or chained event for DMA channels. QDMA channels auto-trigger when a write to the trigger word that is programmed occurs on the associated PaRAM set. All such trigger events are logged into appropriate registers upon recognition.

Once a trigger event is recognized, the appropriate DMA event queue then queues the event/channel. The assignment of each DMA/QDMA channel to an event queue is programmable. Each queue is sixteen events deep; therefore, up to 16 events may be queued (on a single queue) in DMA 145 at a time. Additional pending events that are mapped to a full queue are queued when the event queue space becomes available.

If events 216 on different channels are detected simultaneously, the events are queued based on a fixed priority arbitration scheme with the DMA channels being higher priority events than the QDMA channels. Among the two groups of channels, the lowest-numbered channel is the highest priority.

Each event in the event queue is processed in FIFO order. When the head of the queue is reached, the PaRAM associated with that channel is read to determine the transfer details. The TR submission logic evaluates the validity of the TR and is responsible for submitting a valid transfer request (TR) to an appropriate transfer controller. Normally, Q0 goes to TC0, Q1 goes to TC1, Q2 goes to TC2, Q3 goes to TC3, Q4 goes to TC4 and Q5 goes to TC5.

The DMA transfer controller 220 receives the request and is responsible for data movement, as specified in the transfer request packet (TRP), other necessary tasks like buffering, and ensuring transfers are carried out in an optimal fashion wherever possible.

When configured to receive an interrupt or to chain to another channel on completion of the current transfer, each DMA TC 220 signals completion to the completion detection logic 213 when the transfer is complete. Alternately, a TR may be configured to trigger completion when a TR leaves the boundary of channel controller 210, rather than wait for all of the data transfers to complete. Based on the setting of the DMA interrupt registers, the completion interrupt generation logic 212 is responsible for generating completion interrupts to CPU 135.

A more detailed description of a DMA engine that may be used to embody the invention is described in "TMS320C6474 DSP Enhanced DMA (EDMA3) Controller User's Guide, Texas Instruments, SPRUG11A, revised January 2010 or later, which is incorporated by reference herein.

Figure 3:
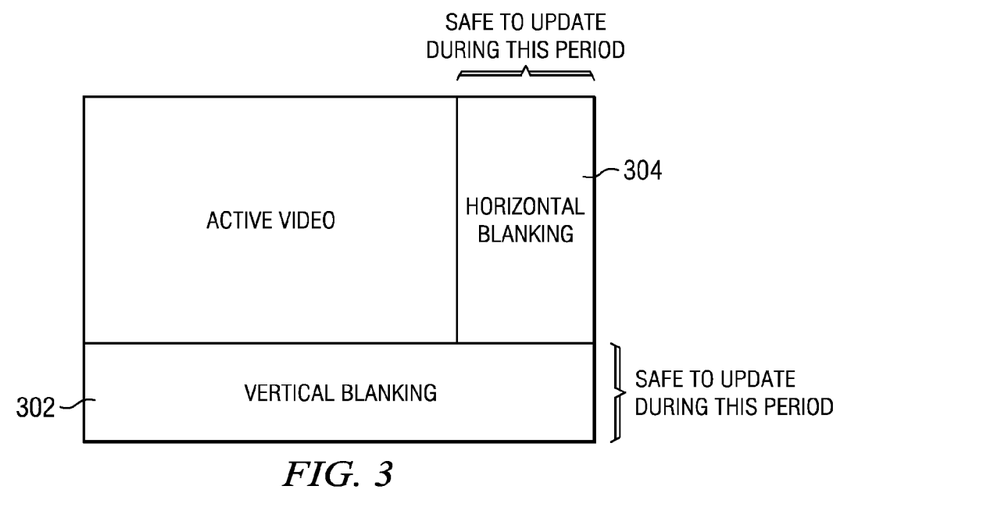
FIG. 3 is schematic illustrating horizontal and vertical blanking periods.

FIG. 3 is schematic illustrating horizontal and vertical blanking periods for a typical TV monitor. The duration of vertical/horizontal blanking intervals is generally less then the time required by software to program the registers in a vsync interrupt routine. For a NTSC system, the vertical blanking interval 302 is around 1.5 ms and the horizontal blanking interval 304 is around 5-6 micro seconds. Thus, programming of non-shadow register during horizontal blanking period is difficult using an interrupt service routine. Even the vertical blanking interval is not always sufficient given the system load on processor 135 that controls video system 100.

Figure 4:
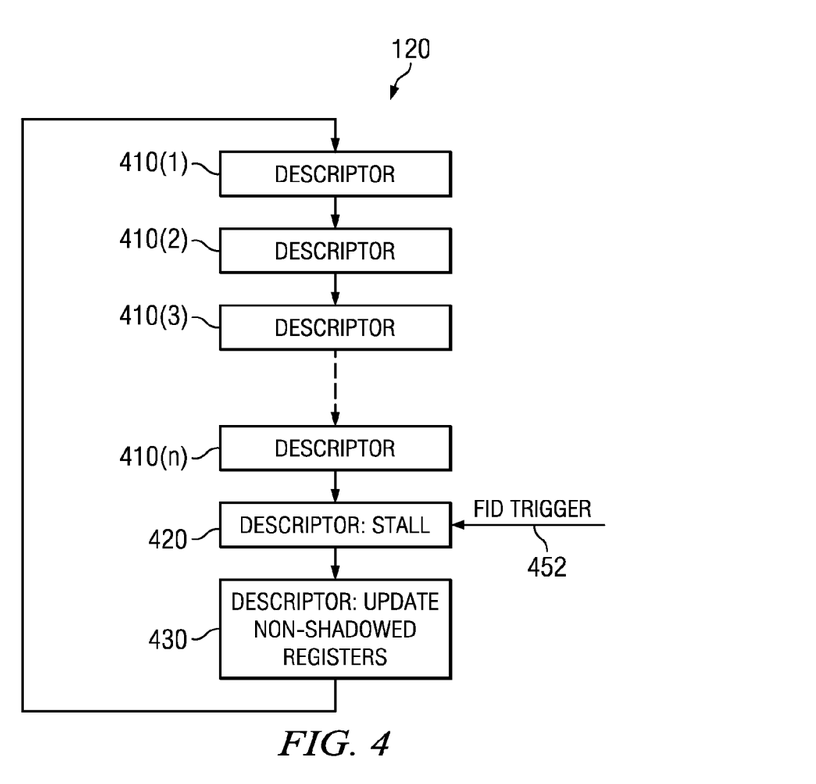
FIG. 4 is an illustration of a linked list of descriptors.

FIG. 4 is an illustration of a linked list of descriptors that may be stored in PaRAM memory 211 of DMA engine 145. DMA engine channel logic 215 provides a parser that parses all descriptors which describe flow of data transfer. This allows DMA engine 145 to transfer data from memory to video hardware or vice versa. The DMA parser can accept set of descriptors linked together. Each descriptor contains commands to the DMA engine to perform an action like transferring data to the display hardware, writing to hardware registers, generating interrupt etc. For example, descriptors 410(1)-410(*n*), 420 and 430 represent a linked list of descriptors that are stored in PaRAM 211.

There is a special descriptor manager which reacts to a change in Field ID as indicated by FID signal 152. It is known as a Sync on Client Control (SCC) descriptor. It stalls DMA processing of a parameter list until there is a Field ID change. In response to a Field ID change, it allows DMA 145 to transfer frame control data from memory to non-shadow registers in VPE 115 and/or VENC 150.

Descriptor 420 is a SCC descriptor which causes the DMA parser to stall after processing descriptors 410(1)-410(*n*) before parsing the next DMA descriptor 430 in the linked list until a VENC Field ID (FID) change has occurred as indicated by FID signal 152. An occurrence of an FID change is indicated at 452. Referring again to FIG. 2, an assertion of FID signal 152 is received by channel logic 215 and causes parsing of an associated linked list to resume. The DMA parser may be resumed for VENC FID change without generating any interrupts to software applications running on processor 135.

One or more descriptors 430 that describe updates of non-shadow registers are placed after SCC descriptor 420. DMA engine 145 will be triggered as soon as the DMA parser processes this descriptor. This will cause an immediate update of non-shadow registers at the start of the vertical blanking interval without the overhead of a software interrupt and related interrupt service processing. In this manner, the full vertical blanking interval is available for transferring data stored in memory 120 or in other memory mapped locations to memory mapped non-shadow registers using a high speed DMA transfer operation.

Thus, a method for operating a video processor controlled by a set of non-shadow registers is provided to allow guaranteed update of non-shadow register without distortion of even single line of live video. Referring again to FIG. 1, a list of updates is prepared in memory module 120 for one or more of the non-shadow registers 118. This is typically done by an application running on processor 135. A region within memory 120 is allocated for storage of a frame buffer 151 and is updated with video data for display device 130 that is coupled to the video processor. Each frame of video image data is transferred by DMA 145 using a linked descriptor list from frame buffer storage 151 to VPE 115 where it may be processed before being displayed. The video data then flows to VENC 150 where it may be encoded and then provided to display 130.

A blanking interval is detected by VENC 150 as each frame of data is provided to display 130. Direct memory access engine 145 is triggered to transfer the list of updates from the memory module to the non-shadow registers during the blanking interval.

Figure 5:
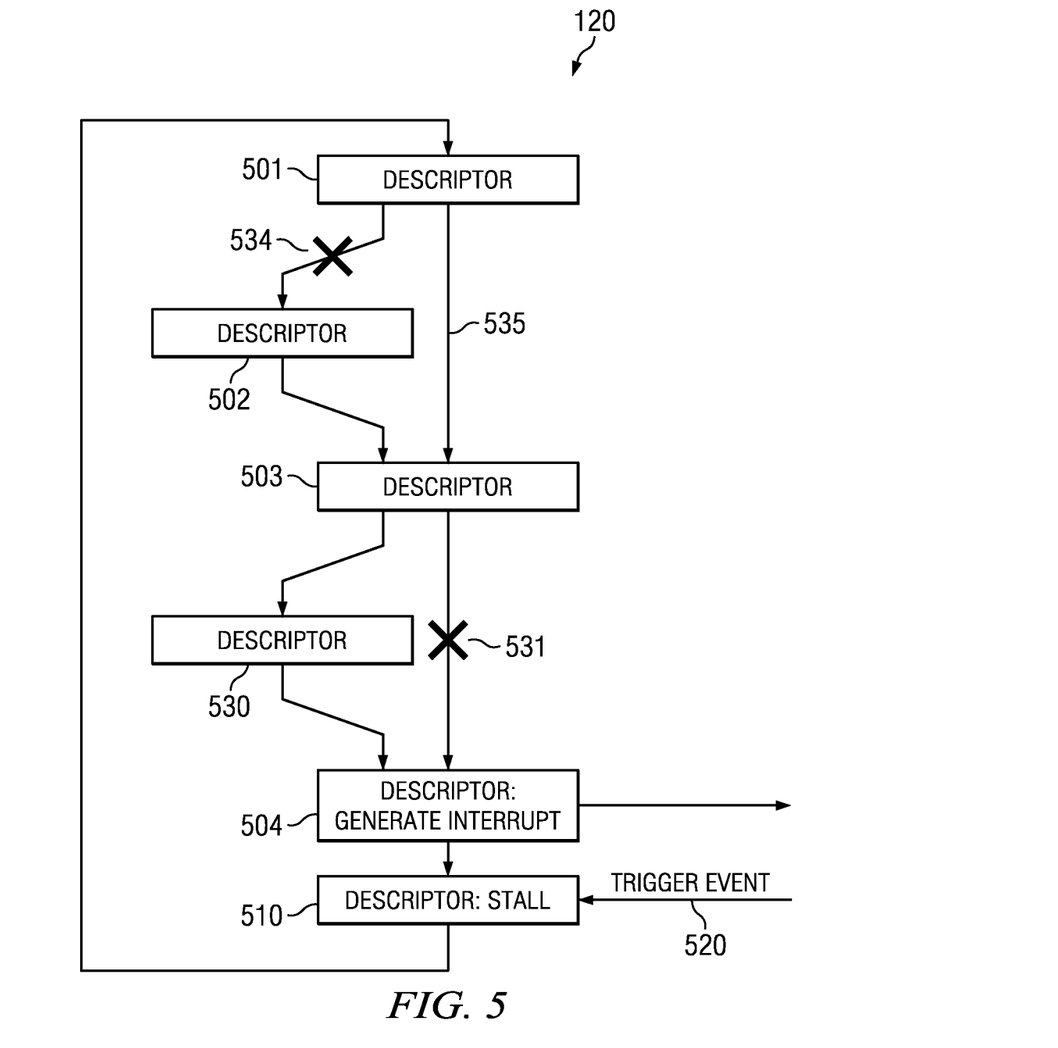
FIG. 5 is an illustration of re-linking a linked list of descriptors.

FIG. 5 is an illustration of re-linking a linked list of descriptors, which may be used for updating the run-time configuration of VPE 115 and/or VENC 150 without disrupting the processing pipeline of video system 100. This may also be used for starting and stopping of different displays on the same hardware engine without interrupting an on going display.

Referring again to FIG. 1, video data received from input sources 105 or from storage unit 125 traverses a processing pipe line, which is connected to DMA 145 on one end and is connected to VENC 150 on the other end. This pipeline, also referred to as a data path, may include various modules within VPE 115 and/or processor 135 that can process video data. Several data paths may be configured by applications running on processor 135 to handle different types of video data, for example, a YUV 420 (luminance and chrominance) and multiple graphics (GRPX) pipe lines may be connected to same VENC 150 and TV 130. While the TV display and VENC are active, an application on processor 135 may wish to start or stop any of path/pipeline while allowing other paths to remain active.

When there could be multiple paths/pipelines connected to VENC 150, all of them may be included in a single display list. There may be multiple runtime configurations that are needed for different paths, such as: scalar configuration on YUV display, GRPX configuration for position on other path etc. However, they may all be displayed a single TV device. In this case, a display list will have multiple descriptors to configure non-shadow registers and the runtime configuration.

An application running on processor 135 may want to make a change to the view that is being displayed on display device 130 by updating the runtime configuration. For example, the application may want to add or remove a second display device, change a scaling ratio for a video window in the frame buffer, or change a position of a video window in the frame buffer.

Referring again to FIG. 5, an example descriptor list may initially include a set of descriptors 501, 502, 503, 504. Descriptor 504 includes control bits to cause the DMA parser to generate an interrupt at the end of parsing of all the descriptors in this set. After this descriptor, a descriptor 510 is linked which stalls the DMA parser and causes it to wait on an external event, such as one of event signals 216 in FIG. 2. And hence the DMA parser stalls after parsing descriptor 510.

Meanwhile, a driver on processor 135 responds to an interrupt initiated by descriptor 504. In the interrupt service routine (ISR) it will determine what changes are to be made to the runtime configuration. If a display device has to be started or stopped, the software may add/remove descriptors by linking and unlinking the existing links with the descriptors for the new display path. For example, descriptor 502 may be removed from the linked list by severing link 534 and replacing it with link 535. A new descriptor 530 may be added to the linked list by severing link 531 and adding links that include descriptor 530, for example. Other changes in the runtime configuration may be made by modifying the content of various descriptors or by adding/deleting descriptors from the linked list.

Once the descriptors are modified and/or re-linked, the application software notifies the DMA parser to proceed by triggering the external event on which the parser is stalling. This may be done by asserting a general purpose input/output signal from processor 135 that is coupled to one of event signals 216, for example.

All these operations will be done much before the next frame time period to avoid any frame drops. When the DMA engine starts again in response to the event signal, the modified display path is added/removed gracefully and hence there is no interruption to the existing display.

In this manner, a method is provided in which video information is transferred to the video processor 115 by DMA engine 145 by parsing a linked list of descriptors that define a run time configuration. The run time configuration may include information that defines scaling, position, and/or any related operation or parameters. The video information in frame buffer 151 is provided to display device 130 after processing by the video processor. An interrupt is generated after the DMA engine parses the linked list of descriptors and then the DMA engine is stalled. The linked list may be modified by an application running on processor 135 while the DMA engine is stalled to update the run time configuration. An application running on processor 135 then asserts an event to trigger the DMA engine to parse the modified inked list of descriptors.

Figure 6:
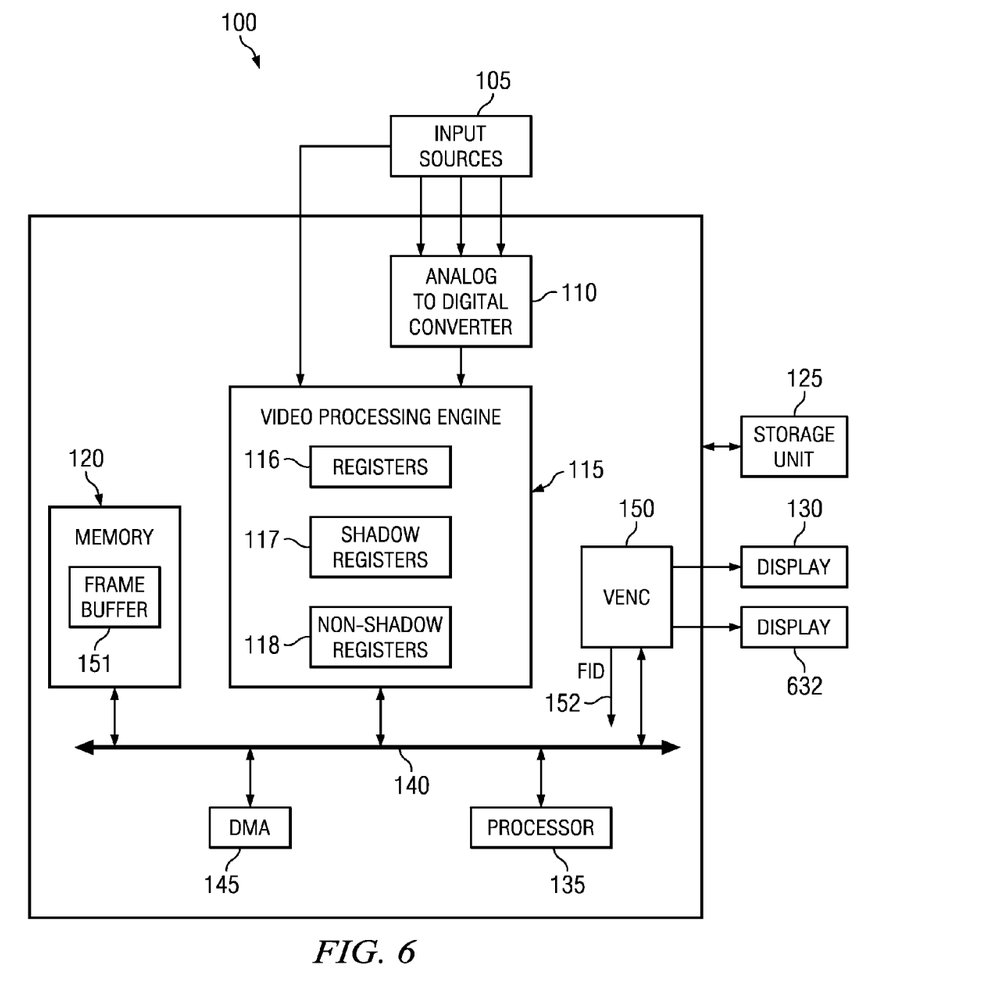
FIG. 6 is a block diagram of another embodiment of an aspect of the invention.

FIG. 6 is a block diagram of another embodiment of an aspect of the invention. In this example, a second display 632 is connected to frame buffer 151 controlled by VENC 150. In traditional video drivers, when using the same hardware DMA engine for transferring video data to different video displays, in order to start/stop a display on a path, the existing display may need to be stopped and then the path processing may need to be started/stopped. Because of this limitation, generally all the display paths are configured at one time before a display is started on any one of the paths and disabling/enabling of paths once a display is started is not allowed.

The runtime configuration may be dynamically modified as described above to add, reconfigure, and remove display 632 without disturbing video image data being provided to display device 130. This solution is well abstracted from the video application layer and now the video applications may seamless start/stop a display at any given time.

Since a display is added to or removed from the existing DMA engine using a priority based linked list, addition and removal of display path becomes seamless and takes less CPU processing time. A change in the descriptor layout because of any hardware change may be achieved just by changing the priorities of different descriptors determined before hand.

Other Embodiments

While the invention has been described with reference to illustrative embodiments, this description is not intended to be construed in a limiting sense. Various other embodiments of the invention will be apparent to persons skilled in the art upon reference to this description. Embodiments of the system and methods described herein may be provided on any of several types of digital systems: digital signal processors (DSPs), general purpose programmable processors, application specific circuits (ASIC), or systems on a chip (SoC) such as combinations of a DSP and a reduced instruction set (RISC) processor together with various specialized accelerators. An ASIC or SoC may contain one or more megacells which each include custom designed functional circuits combined with pre-designed functional circuits provided by a design library. DMA engines that support linked list parsing and event triggers may have different configurations and capabilities than described herein may be used.

Embodiments of the invention may be used for systems in which multiple monitors are used, such as a computer with two or more monitors. Embodiments of the system may be used for video surveillance systems, conference systems, etc.

that may include multiple cameras or other input devices and/or multiple display devices.

A stored program in an onboard or external (flash EEP) ROM or FRAM may be used to implement aspects of the video processing. Analog-to-digital converters and digital-to-analog converters provide coupling to the real world, modulators and demodulators (plus antennas for air interfaces) can provide coupling for waveform reception of video data being broadcast over the air by satellite, TV stations, cellular networks, etc or via wired networks such as the Internet.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the previous discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for operating a video processor having operations controlled by data stored in a set of non-shadow registers, data written into the non-shadow registers immediately effective in control of the video processor, the method comprising:
   preparing a list of updates in a memory module for one or more of the non-shadow registers;
   updating a frame buffer with video data for a display coupled to the video processor;
   detecting a blanking interval after updating the frame buffer; and
   triggering a direct memory access (DMA) engine to transfer the list of updates directly from the memory module to the non-shadow registers without intervention of shadow registers during the blanking interval.

2. The method of claim 1, further comprising:
   transferring video information to the video processor by the DMA engine by parsing a linked list of descriptors that define a run time configuration;
   providing the video information in the frame buffer to a first display device after processing by the video processor;
   generating an interrupt after the DMA engine parses the linked list of descriptors and then stalling the DMA engine;
   modifying the linked list while the DMA engine is stalled to update the run time configuration; and
   triggering the DMA engine to parse the modified inked list of descriptors.

3. The method of claim 2, wherein updating the run time configuration comprises adding or removing a second or more display device.

4. The method of claim 2, wherein updating the run time configuration comprises changing a scaling ratio for a video window in the frame buffer.

5. The method of claim 2, wherein updating the run time configuration comprises changing a position of a video window in the frame buffer.

6. A video system comprising:
   a video processor having operations controlled by data stored in a set of non-shadow registers, data written into the non-shadow registers immediately effective in control of the video processor;
   a video encoder coupled to receive video data from the video processor and having an output for coupling to a display device, wherein the video encoder is configured to update a frame buffer with video data for the display device, and further configured to assert a trigger signal in response to detecting a blanking interval after updating the frame buffer; and
   a direct memory access (DMA) engine coupled to a memory module and to the video processor, the DMA engine having a trigger input coupled to the trigger signal, wherein the DMA engine is configured to transfer a list of updates directly from the memory module to the non-shadow registers without intervention of shadow registers during the blanking interval when the trigger signal is asserted.

7. The video system of claim 6, further comprising a processor coupled to the memory module, wherein the processor is operable to prepare the list of updates by executing program instructions stored in the memory module.

8. The video system of claim 6, wherein the DMA engine is configured to generate an interrupt in response to parsing a particular descriptor.

9. The video system of claim 8, wherein the DMA engine is configured to stall processing of a linked list of descriptors in response to parsing a particular descriptor.

10. The video system of claim 9, wherein the processor is configured to modify the linked list while the DMA engine is stalled, whereby a runtime configuration of the video processor is updated.

* * * * *